Patented Apr. 4, 1933

1,903,362

UNITED STATES PATENT OFFICE

RONALD B. McKINNIS, OF PITTSBURGH, PENNSYLVANIA, ASSIGNOR TO CONTINENTAL CAN COMPANY, INC., OF NEW YORK, N. Y., A CORPORATION OF NEW YORK

ROASTED COFFEE PRODUCT AND METHOD OF MAKING SAME

No Drawing.   Application filed July 21, 1932. Serial No. 623,913.

The invention relates to new and useful improvements in roasted coffee products and the method of producing the same.

Coffee, as at present marketed and prepared for brewing, is ground, and consists of coarser and finer particles, giving ununiform extraction during brewing. Due to the firmness and resistance of the coffee cell walls, the coarse particles are under-extracted in the interior thereof, while the fine particles are over-extracted in the time necessary to obtain proper strength of brew. It is also well known that coffee after it is roasted and ground, evolves a gas rapidly for a considerable period of time, making it difficult to market the coffee in sealed metal containers. The evolving gas causes internal pressure even when the container is closed under vacuum, which results in an objectionable and unsightly swelling or bulging of the ends of the container.

An object of the present invention is to provide a roasted coffee product which is capable of uniform extraction and from which little or no sediment is obtained in the brewing.

A further object of the invention is to provide a roasted coffee product from which a greater portion of the gas initially in the cells of the coffee has been forcibly expelled therefrom without affecting the natural flavor and aroma of the coffee.

A still further object of the invention is to provide a method whereby the gas initially in the cells of the coffee may be forcibly expelled therefrom without affecting the natural flavor and aroma of the coffee.

These and other objects will in part be obvious and will in part be hereinafter more fully disclosed.

Perhaps the improved roasted coffee product forming a part of the present invention will be better understood by a description of one method of producing the product. The coffee bean is roasted in the usual way, and it is ground or broken or cut to suitable size. The particles of coffee are then subjected to a mechanical pressure for the purpose of crushing the particles. This may be accomplished in a hydraulic press, but in the preferred form of method of treating the coffee, the coffee particles are passed between smooth rolls. The rolls are so set that the coffee particles passing between the rolls will be crushed and dropped from the rolls in the form of flakes. Each particle forms a separate flake. The flakes are firm and remain intact during handling. The crushing of the particles of coffee expels from the cells a greater portion of the gas contained in the cells. The cells are crushed or collapsed, and the gas forced therefrom. The particles are quickly crushed and the gas expelled with little or no loss in the aroma and flavor of the coffee.

It is well known that the coffee particles contain, after the bean is roasted, a mixture of gases consisting mainly of carbon dioxide and carbon monoxide gas. The gas is in the cells under considerable pressure, and when the coffee bean is broken, the gas evolves by solution or effusion from the cell walls. Normal evolution of the gas from the roasted coffee carries with it a proportional amount of aroma, thus decreasing the freshness of the coffee. Furthermore, the gas evolving from the coffee cells in a sealed container will create an internal pressure, producing a swell or bulging of the ends of the container, even though the coffee is hermetically sealed in the container in vacuum. This crushing of the coffee particles expels a greater portion of this gas, and thus renders the coffee more suitable for packing in sealed containers. Inasmuch as there is little or no gas evolving from the flaked coffee, there will be no swelling or bulging of the walls of the container.

The flaked coffee falling from the rolls is very thin, and is of substantially uniform thickness. The product produced has advantages over the usual form of ground or pulverized coffee. In the customary grinds of coffee, there are coarser particles and finer particles. These coarser particles are over-extracted on the surface and under-extracted on the interior, while the finer particles are always over-extracted in the time necessary to obtain a proper strength of brew. The firmness and resistance of the cell walls makes proper extraction impossible, and the increase of time does not yield the available strength, but makes the brew too astringent.

When the coffee particles are reduced to the form of thin flakes of substantially uniform thickness, a very rapid and uniform extraction will be obtained for the reason that the coffee components have been rendered substantially equally accessible to the extracting liquid. This flaked form of coffee also gives a better flavored brew, due to the rapid, uniform extraction during brewing. Less coffee is necessary to produce an equally strong brew, and less time is required for making the brew. The flaked form of coffee is adapted for any type of brewing, as by percolators, drip pots, and restaurant urns. In each instance, the same size of flaked particles may be used. The flaked coffee may be placed in sealed containers under vacuum, or packed in an inert gas so as to retain the coffee free from contact with the oxygen content of the air. In neither case is there any objectionable bulging or swelling of the walls of the container. The coffee flakes retain all the natural flavor and aroma of the coffee, and when the container is opened, it will retain its freshness after a considerable period of time, the same as freshly ground coffee.

It is found that the coffee flakes are mechanically stronger and of better appearance if the coffee particles are made more plastic by a tempering process prior to the passing of the coffee particles through the rolls. The plasticity of the coffee particles may be obtained by supplying moisture or heat thereto. The coffee at the end of the roast may be tempered by passing steam therethrough, or a small amount of water, or some other form of tempering liquid. The coffee may be tempered by passing the same through the rolls while hot from grinding, or by heating the rolls. When the tempered coffee particles are passed through the rolls, the flakes formed therefrom will be much firmer, due to the moistening and the heating so that they hold together during brewing with little or no sediment in the brew. While rolls are preferably used for producing the flakes, it is understood, of course, that the article forming the invention of this application may be produced in other ways.

It is also understood that the term "coffee product" is used in the broadest sense, and as including coffee particles which have been de-caffeinated, or coffee particles to which have been added chicory or cereals, the chicory and cereals being flaked in the same manner as the coffee particles to facilitate the extraction of the same. It is also understood that the term "flake" as used in describing the coffee product, is used in its broadest sense, and as defining the condition of the crushed ground coffee particles from which a large portion of the coffee gas has been expelled.

Having thus described the invention, what I claim as new and desire to secure by Letters Patent, is—

1. A roasted coffee product consisting of coffee particles in the form of flakes of such uniform thinness as to render the coffee components therein substantially equally accessible to an extracting liquid.

2. A roasted coffee product consisting of coffee particles in the form of thin firm flakes of substantially uniform thickness.

3. A roasted coffee product consisting of crushed coffee particles in the form of flakes of such uniform thinness as to render the coffee components therein substantially equally accessible to an extracting liquid and from which the coffee gas has been expelled.

4. A roasted coffee product consisting of crushed coffee particles in the form of thin firm flakes containing substantially all of its natural aroma and flavor and from which the greater portion of the gas has been expelled.

5. A method of treating roasted coffee consisting in subjecting the roasted coffee to mechanical pressure for breaking the bean and reducing the coffee particles thus produced to the form of flakes of such uniform thinness as to render the coffee components therein substantially equally accessible to an extracting liquid and for expelling a greater portion of the coffee gas therefrom.

6. A method of treating roasted coffee consisting in subjecting the roasted coffee to sufficient mechanical pressure for breaking the bean and reducing said coffee particles thus formed to the form of thin flakes of such uniform thinness as to render the coffee components therein substantially equally accessible to an extracting liquid and for quickly expelling the gas from the cells of the coffee while retaining substantially all of the natural aroma and flavor therein.

7. A method of treating roasted coffee consisting in breaking the bean after it is roasted and passing said broken particles of coffee between rollers for subjecting said particles to sufficient pressure to crush the cells of the coffee and quickly expel a greater portion of the gas from the cells of the coffee, and for reducing said coffee particles to thin flakes of uniform thickness.

8. A method of treating roasted coffee consisting in breaking the bean after it is roasted and passing the roasted coffee particles while hot from the roast between rollers for subjecting said particles to sufficient pressure to crush the cells of the coffee and quickly expel a greater portion of the gas from the cells of the coffee, and for reducing said coffee particles to thin firm flakes of substantially uniform thickness.

9. A method of treating roasted coffee consisting in subjecting the coffee bean after roasting to a tempering agent, breaking the bean, and subjecting the broken coffee particles to pressure for crushing the cells and expelling a greater portion of the gas therefrom, and for reducing said coffee particles to the form of thin flakes of substantially uniform thickness.

10. A method of treating roasted coffee consisting in breaking the coffee bean into particles and passing the coffee particles between heated rolls disposed so as to crush the particles, expelling a greater portion of the gas from the cells of the coffee, and forming thin firm flakes of substantially uniform thickness.

11. A method of treating roasted coffee consisting in subjecting the coffee bean after roasting to a tempering agent and subjecting the roasted coffee to pressure for breaking the bean and crushing the cells and expelling the greater portion of the gas therefrom and for reducing said coffee to the form of thin flakes of such uniform thinness as to render the components therein substantially equally accessible to an extracting liquid.

12. A method of treating roasted coffee consisting in breaking the bean after it is roasted and subjecting each particle of the broken bean to mechanical pressure for reducing the same to the form of a flake of such uniform thinness as to render the coffee components therein substantially equally accessible to an extracting liquid and for expelling the greater portion of the coffee gas therefrom while retaining substantially all of the natural aroma and flavor in the formed flake.

In testimony whereof, I affix my signature.

RONALD B. McKINNIS.